United States Patent Office 3,203,943
Patented Aug. 31, 1965

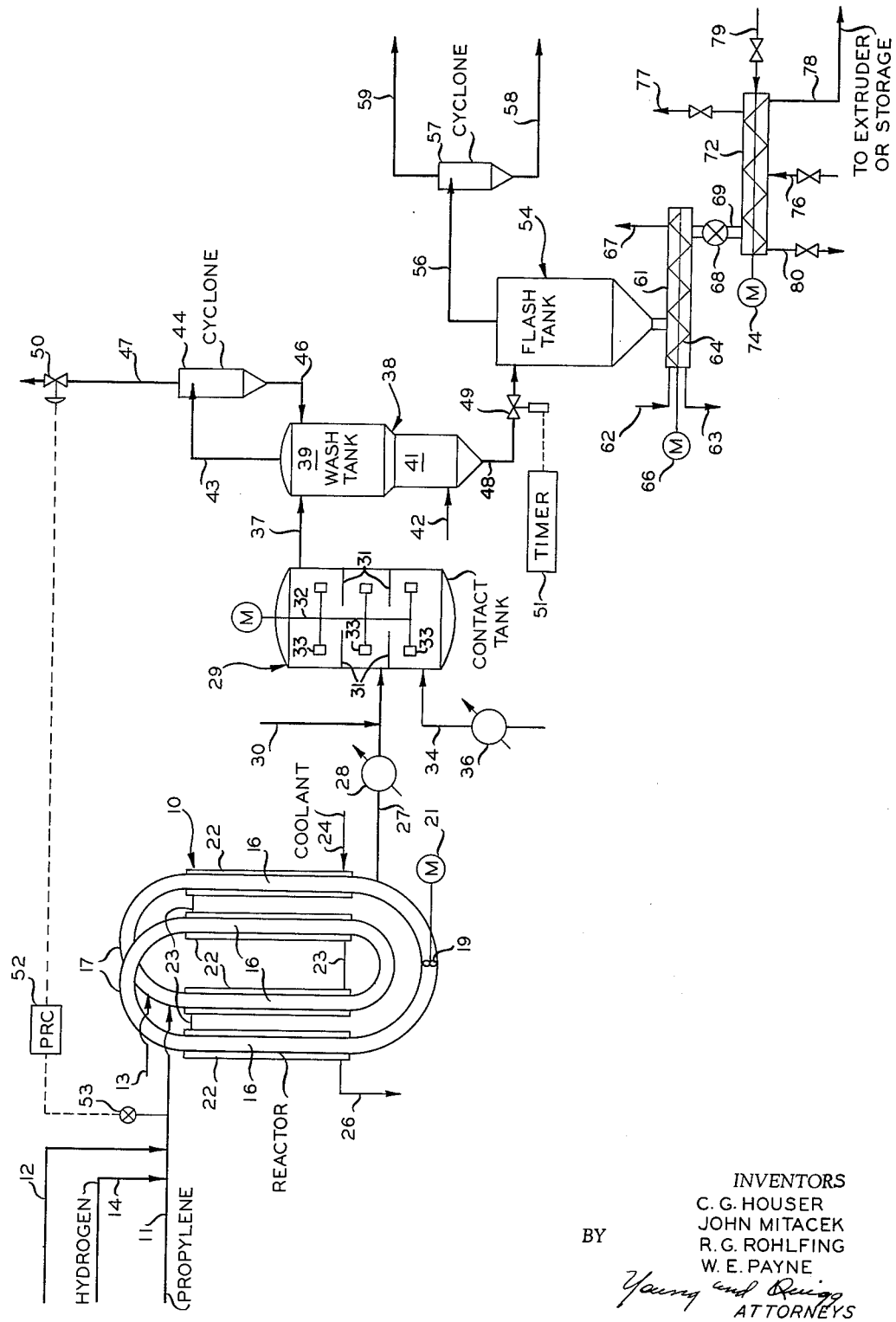

3,203,943
TREATMENT OF OLEFIN POLYMERS
Clarence G. Houser, John Mitacek, Raymond G. Rohlfing, and William E. Payne, all of Bartlesville, Okla., assignors to Phillips Petroleum Company, a corporation of Delaware
Filed Dec. 26, 1962, Ser. No. 247,041
12 Claims. (Cl. 260—93.7)

This invention relates to the treatment of polymers of mono-1-olefins. In one aspect this invention relates to a process for producing a substantially streak-free film from a solid polymer of a mono-1-olefin.

Various reactions for polymerizing olefins are described in the literature, and the polymerizations are usually carried out in the presence of catalysts. One type of catalyst which has been widely used in the polymerization of monoolefins, particularly ethylene, consists of an organometal compound, e.g., triethylaluminum, and a compound of a heavy metal, e.g., titanium tetrachloride. When certain olefins, such as propylene, are contacted with such a catalyst, there is obtained a polymer containing greater or lesser amounts of a fraction which is crystalline and which is characterized by a certain regularity of molecular structure. Thus, a polypropylene molecule can be considered as a chain of 2-carbon units with a methyl side group attached to every other carbon in the chain. Certain polymers of this type are characterized by the fact that they contain series of such monomer units in which all the methyl side groups are oriented in space at the same position or at the same angle with respect to the tertiary carbon atoms to which they are attached. The portion of the polymer having this regular structure is highly crystalline and is generally referred to as isotactic polypropylene. It is recognized that this highly crystalline polypropylene is preferred for most practical applications.

A well-known procedure for preparing isotactic polymers of mono-1-olefins, such as propylene, involves the polymerization of propylene with a catalyst system comprising an alkylaluminum compound and titanium trichloride. One of the problems encountered with polymers prepared by such processes concerns the presence in the products of catalyst residues or ash-forming ingredients. The "ash-content" of a polymer product refers to the inorganic constituents which are present in the polymer in unidentified form and which produce ash when the polymer is burned. The presence of these catalyst residues in the polymer adversely affects the color and heat stability of the polymer, as well as its electrical properties. In one process proposed for the polymerization of mono-1-olefins, the olefin is polymerized in a mass system wherein the propylene is in liquid phase and the polymerization is conducted without the addition of more than small amounts of an inert diluent. In such processes, the only inert diluent present in the polymerization zone is that which may be present in the feed or that which may be used in the introduction of the catalyst. Because no extraneous diluent is present when using the mass polymerization technique, the polymer often contains a larger quantity of catalyst residues than when the same system is used in the presence of a diluent.

The conventional method employed to remove catalyst residues from polymers prepared by these processes is to initially separate the polymer from the diluent or, in the mass polymerization process, from the monomer. Thereafter, the separated polymer is treated with a washing agent which is usually an alcohol, such as isoproyl alcohol. While this treatment of the polymer is quite effective in reducing the ash content of the polymer, the method has certain disadvantages, particularly in a continuous polymerization process. When using a material such as an alcohol, an entirely different type of material is thereby introduced into the system. As a result, it becomes necessary to provide special equipment, for the recovery and purification of the alcohol. From an economical standpoint, the use of a material such as alcohol to treat the polymer is unsatisfactory. Furthermore, the presence of the alcohol in the system presents difficulties in handling because of leakages and evaporation.

A preferred method for removing catalyst residues from polymers of the type described above comprises treating said polymer with a compound such as a diketone which is capable of forming soluble complexes with the metal components in said catalyst residue. Said treating can be carried out at a temperature within the range of 70 to 200° F. by washing said polymer with a solution of the diketone in a solvent, e.g., an inert hydrocarbon, which is also a solvent for the metal complex formed. The substantially ash-free polymer is then separated from the solution containing the soluble metal complex.

In copending application Serial No. 174,002, filed February 19, 1962, by J. S. Scoggin, there is disclosed and claimed an improved process for producing polymers of mono-1-olefins having a low ash content. Broadly speaking, said copending application relates to a mass polymerization process wherein a liquid mono-1-olefin is contacted with a catalyst capable of polymerizing the olefin under polymerization conditions so as to form solid polymer and wherein an effluent containing solid polymer, catalyst residues and liquid olefin is recovered from the polymerization, and the improvement resides in the steps which comprise (1) mixing the effluent with a diketone under conditions such that the olefin remains in the liquid phase, (2) recovering the thus treated effluent and washing same in a countercurrent contacting procedure with a low boiling hydrocarbon, preferably the same olefin used in the polymerization, under conditions such that the hydrocarbon remains in the liquid phase, and (3) thereafter recovering a solid polymer having a reduced ash content, i.e., substantially free of catalyst residues. When operating in the maner of said copending application, it has been found that the polymer product has an ash content of 0.01 weight percent or less. Such a polymer meets the requirements as to color and heat stability and possesses satisfactory electrical properties. Furthermore, the product obtained by the process is superior as regards these properties to a polymer which is purified by conventional methods using alcohols or other treating agents. It is also seen that the process does not introduce foreign materials into the system, which require additional equipment for their separation and recovery. In a commercial operation, this is, of course, a very important advantage.

Polymers produced as by the above-described processes meet all the requirements as to color and heat stability and possess satisfactory electrical properties. Said diketone treating process for removing catalyst residues possesses several advantages over other methods for removing catalyst residues from such polymers. However, one disadvantage of said diketone treating process is that when film is produced from the polymer product it is subject to streaking. In general, streaked film is not acceptable for packaging of articles where optimum optical properties are desired.

Polymer films, e.g., polypropylene film, can be made by both the water quench and the chill roll methods. In the United States most film producers currently favor the chill roll method because of higher production rates and product superiority. The chill roll film has inherently better optical properties than does the water quench film. Polymers produced by the mass polymerization processes described herein, and which have not been treated in accordance with the present invention, will very frequently produce streaked film when extruded under certain conditions. This streaking is due to streaks or bubble-like imperfections which appear in the film web. Microscopic examination of these streaks have showed them to be elongated voids of various sizes arranged in the machine direction of the film. There are no gels, specks, dust, or other foreign material associated with these bubbles. Said bubbles usually appear to be almost perfect spheres. Streaks as long as 1 inch and bubbles as large as 1/16 inch in diameter have been observed.

When the film extrusion temperature exceeds about 500° F., said bubbles begin appearing throughout the film. The number of said bubbles becomes progressively greater until a maximum is reached at about 550° F. Above this temperature said bubbles decrease in number and at 600° F. are not present. However, temperatures between about 500 and about 550° F., especially at approximately 550° F., produce a film of superior optical properties such as improved clarity and color. It is thus desirable to operate at these temperatures if possible and for this reason a solution to the problem of said bubble and/or streak formation is desirable.

Said streaking appears to be a phenomenon associated with the diketone treating process for removing catalyst residues from the polymer. Polymers produced by the mass polymerization processes described herein but which have been treated in accordance with other catalyst removal processes yield essentially streak-free film when extruded under similar conditions. Despite the above-described streaking difficulties, said diketone treating process is preferred because of the superior results obtained with respect to catalyst removal and for other advantages. It is therefore desirable to provide a process for producing an essentially streak-free film from polymers which have been made by the polymerization systems described herein and which polymers have been treated by the diketone treating process for removal of catalyst residues.

We have discovered that the above-described streaking difficulties can be overcome by contacting said diketone treated polymers with water vapor at elevated temperatures. Thus, broadly speaking, the present invention resides in contacting said diketone treated polymers with water vapor at a temperature within the range of from 220 to 275° F. for a period of time sufficient to yield a polymer product which when extruded into a film will produce a substantially streak-free film. The present invention is thus an improvement over those mass polymerization processes, including the process of said copending application, which comprises contacting a mono-1-olefin with a catalyst capable of polymerizing said olefin under polymerization conditions so as to form a solid polymer, and treating said polymer with a diketone to remove catalyst residues.

Thus, an object of this invention is to provide an improved process for producing polymers of mono-1-olefins having a low ash content and which can be extruded into substantially streak-free film. Another object of this invention is to provide a process for treating polymers prepared in a mass polymerization, and which polymers have been treated with a diketone to remove catalyst residues therefrom, in order to provide polymers which can be extruded into substantially streak-free film. Other aspects, objects, and advantages of the invention will be apparent to those skilled in the art upon a study of this disclosure.

According to the present invention, there is provided in a mass polymerization process wherein a liquid mono-1-olefin is contacted in a polymerization zone with a catalyst capable of polymerizing said olefin under polymerization conditions so as to form solid polymer, said solid polymer is contacted or washed with a diketone to remove catalyst residues therefrom, and a solid polymer product substantially free of catalyst residues is recovered, the improvement which comprises: contacting said polymer product with water vapor at a temperature within the range of from 220 to 275° F. for a period of time sufficient to yield a polymer product which when extruded into film will produce a substantially streak-free film.

The water vapor used in the practice of the invention can be obtained from any suitable source. For example, saturated steam, superheated steam, or wet inert gases can be utilized. In the practice of the invention the amount of water vapor used is an excess, i.e., water vapor is always present during the contacting step. This presents no problem when one is utilizing steam as the water vapor because obviously when any steam is present during the contacting there will be an excess. As a guide, however, in the amount of steam which can be used, it has been found that quantites of steam within the range of from 0.01 to 0.1 pound of steam per pound of polymer is sufficient. It is, however, within the scope of the invention to use greater amounts of steam.

When using a wet inert gas as the source of the water vapor, said gas should contain sufficient water vapor to yield a treated polymer which will produce a commercially acceptable film (as defined hereinafter) when said polymer is extruded into film. We have found that from 0.1 to 0.4 pound of water vapor per pound of inert gas is satisfactory. A more preferred range for said water vapor content is from 0.2 to 0.3 pound of water vapor per pound of inert gas. It is within the scope of the invention to use inert gases containing amount of water vapor outside these ranges. For example, water vapor contents as low as 0.015 pound of water vapor per pound of inert gas will effect an improvement but will not usually yield a commercially acceptable film. Water vapor contents above 0.4 pound of water vapor per pound of inert gas are not usually used because they are not necessary. As used herein and in the claims, unless otherwise specified, the term "inert gas" includes any gas which is non-reactive under the treating conditions with the polymer being treated. Examples of such gases are argon, helium, krypton, neon, xenon, nitrogen, carbon dioxide, etc. Nitrogen is a presently more preferred gas because it is inexpensive and readily available.

The temperature at which the contacting of the polymer with the water vapor is carried out is relatively important. Temperatures below 220° F. are ineffective and cannot be used. Temperatures above 260° F. do not appear to be necessary to obtain the desired results. Temperatures as high as 275° F. have been shown to give satisfactory results. Thus, the broad range of temperatures for the water vapor contacting step of the invention is from 220 to 275° F. A more preferred range is from 235 to 260° F.

The contact time, or residence time of the polymer being treated in the water vapor contacting zone, can vary within rather wide limits, such as from 0.5 to 20 minutes. A presently preferred range of contact times is from 1 to 8 minutes.

The contacting of the polymer with the water vapor can be carried out in any suitable manner and in any suitable apparatus which can be used for contacting a solid and a gas. In one presently preferred method described further hereinafter, the polymer is contacted as it passes through a purge conveyor. Said conveyor is a conventional piece of apparatus comprising a housing having a revolving screw or auger therein for moving the polymer through said housing. Water vapor, e.g., steam or wet inert gas, is introduced into one end of said housing and removed at the other. It is also within the scope of the invention to utilize the so-called fluidized technique for contacting the polymer particles with water vapor. When utilizing this technique the polymer particles are formed into a bed and the treating gas comprising water vapor is passed through said bed at sufficient velocity to fluidize the polymer particles.

As mentioned hereinbefore, polymers which are treated in accordance with the present invention are prepared from mono-1-olefins. The present invention is particularly applicable to the treatment of isotactic polymers which are prepared by polymerizing mono-1-olefins containing from 2 to 5 carbon atoms per molecule. Examples of such monomers include ethylene, propylene, 1-butene, 1-pentene, 3-methyl-1-butene, and the like. It is to be understood that mixtures of two or more monomers can be employed in the polymerization to produce copolymers which are then treated by the present process. In a preferred embodiment of the invention, propylene is utilized as the monomeric material.

Since a wide variety of catalyst systems can be employed in the polymerization, it is not intended to limit the invention to any particular catalyst system. Catalyst systems suitable for use in the polymerization are those which are capable of polymerizing a mono-1-olefin in a mass polymerization and under conditions such that solid polymer in particle form is produced. Catalyst systems suitable for use can be broadly defined as comprising an organometal compound and a metal salt. A particularly suitable catalyst is one which comprises (a) a compound having the formula $R_nMX_m$, wherein R is an alkyl, cycloalkyl, or aryl radical or combinations of these radicals, such as alkaryl, aralkyl, and alkylcycloalkyl, X is hydrogen, or a halogen, including chlorine, bromine, iodine and fluorine, M is aluminum, gallium, indium or thallium, $n$ is from 1 to 3, inclusive, $m$ is from zero to 2, inclusive, and the sum of $m$ and $n$ is equal to the valence of the metal M, and (b) a halide of a metal of Group IV–B, V–B, VI–B or VIII. The hydrocarbon radicals which can be substituted for R in the aforementioned formula include radicals having up to about 20 carbon atoms each. Radicals having 10 carbon atoms or less are preferred since the resulting catalyst composition has a greater activity for initiating the polymerization.

Examples of compounds corresponding to the formula $R_nMX_m$ which can be employed include trimethylaluminum, triethylaluminum, triisobutylaluminum, tri-n-butylaluminum, tri-n-pentylaluminum, triisooctylaluminum, tri-n-dodecylaluminum, triphenylaluminum, triethylgallium, triphenylgallium, tricyclohexylgallium, tri-n-butylindium, triethylthallium, diethylaluminum hydride, $CH_3AlCl_2$, $(CH_3)_2AlCl$, $C_2H_5AlCl_2$, $(C_2H_5)_2AlCl$, $(C_4H_9)_2AlBr$, $(C_8H_{17}AlI_2$, $(C_3H_7)_2GaF$, $(C_6H_{11})_2GaCl$ (cyclohexane derivative), $(C_6H_5)GaBr_2$ (benzene derivative), $C_{20}H_{41}GaBr_2$, $(C_{14}H_{29})_2GaF$, $(C_6H_5)_2InCl$ (benzene derivative), $C_8H_{17}InF_2$, $(C_6H_{11})InBr_2$ (cyclohexane derivative), 3-methylcyclohexylaluminum dichloride, 2-cyclohexylethylgallium dichloride, p-tolylberyllium iodide, di-(3-phenyl - 1 - methylpropyl)indium fluoride, 2-(3-isopropylcyclohexyl)ethylthallium dibromide, and the like.

The metal halide component of the catalyst system is preferably a halide of a Group IV–A metal, i.e., titanium, zirconium, hafnium, and germanium. However, it is to be understood that halides of metals of the other groups specified above, such as vanadium, molybdenum, tungsten, cobalt, and iron can also be employed in the catalyst system. The trichlorides, trifluorides, tribromides, and triiodides, as well as the tetrachloride, tetrafluorides, tetrabromides and tetraiodides of the various metals, can be used in the catalyst system, either individually or as mixtures of two or more of the metal halides. It is frequently preferred to employ a trichloride, such as titanium trichloride, in the polymerization; said trichlorides can be employed as substantially pure material or in conjunction with other materials. One catalyst system which can be employed comprises a dialkylaluminum chloride and titanium trichloride.

One presently preferred catalyst system which can be employed in the polymerization comprises a dialkylaluminum chloride and the reaction product obtained by reacting aluminum and titanium tetrachloride. Said reaction between aluminum and titanium tetrachloride is usually carried out at an elevated temperature, for example, at a temperature in the range of 360 to 600° F., preferably from 375 to 450° F. Said reaction product can be represented by a formula which is approximately $AlTi_3Cl_{12}$ (or $3TiCl_3 \cdot AlCl_3$).

The amount of catalyst employed in the polymerization can vary over a rather wide range and will depend at least to a certain degree upon the particular catalyst system utilized. However, the determination of the actual amount of the catalyst employed in any particular polymerization is well within the skill of the art. In general, the mol ratio of the organometal compound to the metal salt falls within the range of 0.02 to 50 mols. When employing said preferred catalyst system, the mol ratio of the dialkylaluminum halide to said reaction product usually ranges from 1.0:0.005 to 1.0:50.0, preferably 1.0:0.1 to 1.0:10.0. The amount of the dialkylaluminum halide used should be at least $1.0 \times 10^{-4}$ gm./gm. of monomer and can be as much as $25 \times 10^{-4}$ gm./gm. of monomer. The amount of said reaction product employed would generally be in the range of $1.5 \times 10^{-4}$ to $10 \times 10^{-4}$ gm./gm. of monomer.

Although not essential to the conduct of the polymerization, it is often desirable to carry out the polymerization in the presence of elemental hydrogen. When so operating, hydrogen is added in an amount sufficient to provide from 0.15 to 0.40 mol percent hydrogen in the liquid mono-1-olefin phase in the polymerization zone. By operating in this manner, the productivity of the catalyst is increased and certain properties of the polymer, e.g., flexural modulus, are improved.

The diketones suitable for use in removing catalyst residues from the polymers include alpha-diketones and beta-diketones. These diketones can also be defined as being selected from the group consisting of compounds having the formulas:

(1)

and (2)

wherein R and R' are hydrocarbon radicals, such as alkyl, cycloalkyl, and aryl. Examples of suitable alpha-diketones include, among others, the following: 2,3-butanedione, 2,3-pentanedione, 3,4-hexanedione, 4-methyl-2,3-pentanedione, 3,4-heptanedione, 5-methyl-2,3-hexanedione, 2,5 - dimethyl-3,4-hexanedione, 2,2,5,5-tetramethyl-3,4-hexanedione, 1,2-cyclopentanedione, 3-methyl-1,2-cyclopentanedione, 1,2-cyclohexanedione, bibenzoyl, bi-2-furoyl, methylphenylglyoxal, phenylbenzylglyoxal, 4,4'-dimethoxybenzil, and the like. The following are examples of suitable beta-diketones: 2,3-pentanedione (acetylacetone), 2,4-hexanedione, 2,4-heptanedione, 5-methyl-2,4-hexanedione, 2,4-octanedione, 5,5-dimethyl-2,4-hexanedione, 3-ethyl-2,4-pentanedione, 3,3-diethyl-2,4-pentanedione, 2,2-dimethyl-3,5-nonanedione, 1-cyclohexayl-1,3-butanedione, 5,5-dimethyl-1,3-cyclohexanedione, 1-phenyl-1,3 - butanedione, 1-(4-biphenylyl)-1,3-butanedione, 1-phenyl-1,3-pentanedione, 1-phenyl-5,5-dimethyl-2,4-hexanedione, 1,3-diphenyl-1,3-propanedione, 1,4-diphenyl-1,3 - butanedione, 1-phenyl-2-benzyl-1,3-butanedione, 1-phenyl-3-(2-methoxyphenyl)1,3-propanedione, 1-(4-nitrophenyl)-1,3-butanedione, 1-(2-furyl)-1,3-butanedione, 1-(tetrahydro-2-(furyl)-1,3-butanedione, and the like.

A more comprehensive understanding of the invention can be obtained by referring to the drawing which is a flow diagram illustrating a preferred embodiment of the invention. While the drawing is described with regard to a process in which propylene is polymerized with a specific catalyst system, it is to be understood that it is not intended to limit the invention to this specific embodiment. As discussed hereinbefore, the invention is broadly applicable to the treatment of polymers of mono-1-olefins prepared by mass polymerization, utilizing a catalyst capable of polymerizing the monomer to a solid polymer under the conditions employed. As used herein, the term "mass polymerization" is used to designate a polymerization which is conducted with the monomer in liquid phase and without the addition of more than small amounts of an inert diluent. The expression "small amounts of an inert diluent" is intended to mean such amounts of inert diluent as may be introduced into the polymerization zone by way of inert material in the monomer feed and inert diluent employed for ease of handling the catalyst components.

Referring now to the drawing, propylene is charged to reactor 10 through line 11. Prior to use in the polymerization, the propylene is treated by conventional methods in order to remove contaminants such as oxygen, $CO_2$ and moisture. It is also the usual practice to purge the reactor with an inert gas, such as nitrogen, in order to remove such contaminants prior to commencement of the polymerization. Lines 12 and 13, respectively, provide means for charging the ingredients of a preferred catalyst system, namely, (a) the above-described reaction product obtained by reacting aluminum and titanium tetrachloride and (b) diethylaluminum chloride, to the system. It is to be noted that line 12 is connected to line 11 so that said reaction product can enter the reactor along with the liquid propylene. This is a preferred manner of operation. As mentioned above, it has been found to be advantageous to conduct the polymerization in the presence of hydrogen. As shown, the hydrogen enters the propylene feed line through line 14 and is charged to the reactor along with the liquid propylene.

The reactor illustrated in the drawing is a loop-type reactor which comprises two loops. Each loop is composed of two straight legs 16 which may conveniently be in the form of elongated pipe sections. The ends of the legs of the reactor are conveniently interconnected by means of L's 17 so as to provide a continuous flow path through the reactor. The reactor is furnished with an impeller 19 which is operatively connected to a turbine 21. The operation of the impeller provides motive force for flowing the materials through the loop reactor. The vertical legs of the loop reactor are encompassed by heat exchange jackets 22 which are interconnected by means of lines 23. Line 24 connected to the heat exchange jacket associated with one of the outer legs provides means for introducing a coolant such as water. The coolant flows through the heat exchange jackets at a temperature and at a rate such as to maintain a desired polymerization temperature in the reactor. The coolant is removed from the reactor system by means of line 26 which is connected to the other outer leg of the reactor. Although it is often preferred to employ a loop-type reactor, it is to be understood that the polymerization can be conducted in any suitable polymerization zone, such as in a closed reaction vessel provided with a stirring means.

The conditions employed in conducting the polymerization will vary somewhat depending upon the mono-1-olefin utilized. The polymerization temperature is generally in the range of zero to 160° F. In the polymerization of ethylene, a temperature in the range of zero to 45° F. is usually employed. In the case of propylene, the temperature in reactor 10 can vary within the range of 90 to 160° F. When polymerizing a higher olefin, such as 1-butene, a lower polymerization temperature is used, e.g., 86° F. or lower. In the polymerization of olefins containing 5 carbon atoms, still somewhat lower temperatures are utilized, e.g., about 75° F. or lower. In general, the polymerization is conducted at a temperature such that solid polymer in particle form is obtained in the polymerization. The actual amount of solid polymer formed is also dependent upon the particular catalyst system used. It has been found that the preferred catalyst system as described above produces a very high percentage of solid polymer with a minimum formation of soluble polymer. The pressure employed in reactor 10 is sufficient to maintain the reactants in the liquid phase. The maximum pressure used is only limited by practical considerations, although it is generally undesirable to exceed a pressure of 2000 p.s.i.g. When polymerizing ethylene, the lower limit of pressure is about 425 p.s.i.g. at a polymerization temperature of about 0° F. In the case of the polymerization of propylene, the lower limit of pressure is about 225 p.s.i.g. at a polymerization temperature of about 90° F. In the case of the higher olefins the lower limit of pressure will be somewhat lower. The pressure desired in reactor 10 can be conveniently regulated by an automatic control means as will be discussed more in detail hereinafter. The residence time in reactor 10 can range from about 1 to about 5 hours, with a residence time of about 3 hours being preferred.

The effluent stream recovered from reactor 10 through line 27 comprises solid polymer, catalyst residues, soluble polymer and liquid propylene. The stream usually contains in the range of 25 to 40, preferably 35, weight percent solid polymer. After removal of the effluent through line 27, it is passed through indirect heat exchange means 28 prior to introduction into a lower portion of contact tank 29. In the heat exchange means, the effluent is heated to a temperature which is slightly higher than the temperature employed in reactor 10. Although it is within the contemplation of the invention to introduce the effluent directly into the contact tank without prior heating, it has been found that improved results as regards catalyst removal are obtained if the temperature maintained in the contact tank is slightly higher than the polymerization temperature. In the case of polypropylene, the effluent in line 27 is usually heated to a temperature in the range of 100 to 170° F. In the case of effluents containing higher olefin polymers, a somewhat lower temperature can be used. The pressure in contact tank 29 is sufficient to maintain the propylene in the liquid phase, and it is usually substantially the same as the pressure in reactor 10. Line 30 provides means for introducing a diketone, such as acetylacetone, into the contact tank. It is noted that line 30 is connected to line 27 so that the acetylacetone enters the contact tank along the effluent.

In contact tank 29 the acetylacetone is thoroughly mixed with the effluent from reactor 10. The contact tank depicted in the drawing comprises an enclosed vessel having baffle members 31 disposed in the upper and lower portion of the tank. The baffle members are attached to the walls of the tank and are each provided with a central opening through which the shaft of stirring means 32 passes. The positioning of the baffle members in this manner in effect divides the contact tank into upper, intermediate and lower sections. Each of these sections is provided with a stirrer 33 which is attached to the shaft of stirring means 32. It has been found that particularly good contact is obtained between the acetylacetone and the effluent from reactor 10 when utilizing this specific structure. However, it is to be understood that it is not intended to limit the invention to any particular contact tank and that any enclosed vessel provided with a suitable stirring means can be employed.

The diketone, e.g., acetylacetone, can be introduced into line 27 by itself, or it can be added as a solution in a hydrocarbon which is inert to the reactants. However, the acetylacetone is preferably added as a solution, for example, a 1 percent solution, in the monomer. The amount of treating agent added in this manner may range from 1 to 5 times the stoichiometric equivalent, based on the amount of catalyst present. The contact time in contact tank 29 can vary within rather wide limits, e.g., from 5 minutes to 1 hour. However, it is usually preferred to use a contact time in the range of 20 to 30 minutes.

As previously mentioned, heat exchanger 28 provides means for heating the effluent from reactor 10 prior to its introduction into contact tank 29. As an alternative and often preferred procedure, line 34 provided with indirect heat exchange means 36 furnishes a means for increasing the temperature in the contact tank. When using this procedure, a low-boiling hydrocarbon is heated in heat exchanger 36 and then passed into the contact tank in order to raise the temperature therein to a desired level. As the low-boiling hydrocarbon, it is usually preferred to employ the monomer, e.g., propylene. However, a paraffinic hydrocarbon containing from 4 to 6 carbon atoms per molecule, such an n-pentane or n-hexane can also be used. This method of operation is often preferred because it obviates any danger of agglomeration of the polymer particles which may occur when the effluent is directly heated in heat exchanger 28.

The treated effluent is withdrawn from an upper portion of contact tank 29 through line 37 and then passed into the upper portion of wash tank 38. It is preferred to introduce the effluent into a lower portion of the contact tank and to withdraw the treated effluent from an upper portion of the tank since this method of operation ensures good contact between the solid polymer particles and the acetylacetone. As shown in the drawing, the wash tank comprises an enlarged upper portion 39 and a smaller lower portion 41. This type of structure is preferred although it is within the scope of the invention to employ a wash tank having a uniform cross section. Line 42 provides means for introducing wash liquid into the lower portion of the wash tank. Although various light hydrocarbons, particularly paraffinic hydrocarbons containing from 4 to 6 carbon atoms per molecule, such as n-pentane, can be employed as the wash liquid, it is preferred to utilize the monomer, e.g., propylene, for this purpose. Furthermore, because of the improved results obtained with propylene, it is not to be implied that the use of propylene is equivalent to the use of a material such as pentane as the wash liquid. A mixture of the monomer and a light hydrocarbon can also be employed as the wash liquid. The effluent entering the wash tank through line 37 flows downwardly therethrough and contacts the liquid propylene in countercurrent flow. The liquid propylene in contacting the solid polymer removes catalyst residues, and the solid polymer settles into the bottom of the wash tank. This settling of the polymer is facilitated by providing a wash tank with an enlarged or expanded upper portion 39. The ratio of the cross sectional area of the enlarged upper portion to the cross sectional area of the lower portion of the wash tank is usually in the range of 1.5 to 2.5. When the wash liquid reaches the enlarged upper portion of the wash tank, its velocity is decreased, thereby causing solid polymer contained in the propylene to fall toward the bottom of the tank. In general, the velocity of the wash liquid in the enlarged upper portion is maintained at the minimum value which is consistent with efficient removal of catalyst residues. This manner of operation conserves the amount of wash liquid used and reduces to a minimum the amount of polymer carried out of the wash tank in the overhead stream. The velocity of the wash liquid in the enlarged upper portion of the wash tank is usually in the range of 0.5 to 2.0, preferably from 0.2 to 1.0, feet per minute. The ratio of the amount of wash liquid to polymer, on a weight basis, is generally in the range of 5:1 to 25:1. Actually the upper limit is not critical, being limited only by the capacity of the column. However, as regards the lower end of the range, there must be enough wash liquid to provide good contacting and a "hindered" settling effect in the column.

The overhead stream recovered from wash tank 38 through line 43 contains propylene, soluble polymer, catalyst residues and a small amount of solid polymer. The overhead stream is passed into cyclone separator 44, the underflow from which contains the solid polymer. The solid polymer separated in cyclone separator 44 is returned to the wash tank by means of line 46. The overflow from cyclone separator 44, which is withdrawn through line 47, contains propylene, soluble polymer and catalyst residues. This stream can be further treated in order to recover the propylene for further use in the process. The overhead stream is withdrawn from the wash tank at a rate such as to maintain a predetermined pressure in reactor 10. This is accomplished by means of motor valve 50 which is positioned in line 47. Valve 50 is operatively connected to pressure recorder controller 52 which is preset at the pressure to be maintained in reactor 10. The controller receives a signal from pressure transmitter 53 which is connected to line 11. Since line 11 is connected to reactor 10, the signal received by the controller corresponds to the pressure in the reactor. In the operation of the control system, if it is desired to maintain a pressure of 350 p.s.i.g. in reactor 10, controller 52 is given this setting. Now if the pressure in reactor 10 rises to 360 p.s.i.g., pressure transmitter 53 transmits a signal proportional to this pressure to controller 52. Controller 52 then operates motor valve 50 so as to increase the degree of opening of this valve. As a result, the rate of withdrawal of the overhead stream from the wash tank is increased, thereby lowering the pressure in the entire system. When the pressure in reactor 10 has decreased to 350 p.s.i.g., the controller operates valve 50 so that the overhead stream from the wash tank is withdrawn at a rate such as to maintain this pressure. When the pressure in reactor 10 is lower than that which it is desired to maintain, the opposite sequence of events occurs and the amount of the overhead stream withdrawn from the wash tank is decreased.

The temperature maintained in the wash tank is generally somewhat lower than that in the contact tank. This results from the fact that the propylene charged through line 42 is generally at a comparatively low temperature, e.g., 100° F. and below. The pressure maintained in the wash tank is sufficient to maintain the propylene in the liquid phase.

As mentioned above, the solid polymer in the wash tank settles to the bottom of the tank. As a result of this settling, the slurry of solid polymer in propylene recovered through line 48 generally contains up to about 50 weight percent solids, e.g., from 40 to 50 weight percent. The slurry of polymer in propylene is withdrawn from the wash tank through a suitable flow control means, such as cyclically operated motor valve 49. This valve is operatively connected to timer 51 which controls the frequency of the valve cycle. The slurry can be withdrawn from the wash tank at any desired rate merely by adjusting the setting of the timer. It is preferred to utilize a cyclically operated motor valve which opens, e.g., every 10 to 30 seconds, for a short period of time, e.g., of about 1 second. This type of operation creates instantaneous pressure and velocity changes in the column, thereby causing turbulence and a concomitant shearing of the polymer particles. As a result, the efficiency of the washing action is greatly increased. The operation of the timer can also be controlled by means of a solids level controller which is operatively connected to the lower portion of the wash tank and to the timer. When utilizing this arrangement of apparatus, the timer operates motor valve 49 so that a desired level of polymer solids is maintained in the bottom portion of the wash tank.

Upon passing through valve 49, which operates as a pressure letdown valve, the polymer slurry flashes as it passes into flash tank 54. In the flash tank the pressure may range from 16 to 65 p.s.i.g. while the temperature may be in the range of −50 to 15° F. The propylene which flashes off is withdrawn from the flash tank through line 56 and then passed into cyclone separator 57. In the cyclone separator, any solid material contained in the gaseous propylene stream is recovered as underflow through line 58 and is usually discarded. The gaseous propylene is recovered as the overflow through line 59. The gaseous propylene is thereafter reused in the process after being subjected to suitable purification operations.

Solid polymer in particle form and containing residual amounts of propylene is withdrawn from the bottom of flash tank 54 and falls into drier-conveyor 61. This conveyor is equiped with a jacket through which hot water or other suitable heat exchange fluid can be circulated. The heat exchange fluid is introduced into the jacket through line 62 and is withdrawn therefrom through line 63. Conveyor 61 is provided with an auger 64 which is powered by a motor 66. As the polymer solids are moved through the conveyor by means of the auger, propylene is evaporated as a result of the heat added to the moving polymer by the hot water circulating through the jacket. The propylene vapors are removed from conveyor 61 through line 67. This gaseous propylene can thereafter be suitably treated and reused in the process. After the polymer solids are conveyed to the end of conveyor 61, they are passed through rotary valve 68 positioned in conduit 69. The polymer solids then drop into purge conveyor 72 which contains an auger 73 driven by a motor 74.

In the practice of the invention of said copending application, as the polymer solids are moved through conveyor 72, they are contacted with a heated non-combustible gas introduced through line 76. Any suitable non-combustible gas, such as carbon dioxide, nitrogen, or the like, can be utilized. In flowing through conveyor 72, the gas contacts the polymer solids as they are moved therethrough, thereby evaporating residual amounts of propylene and also purging previously evaporated propylene. The gases are withdrawn from conveyor 72 through line 77 after which they can be passed to a flare. Polymer solids, substantially free of propylene and having an ash content of less than about 0.01 weight percent, are recovered from purge conveyor 72 through line 78. The polymer so recovered can then be transferred to suitable storage facilities or to subsequent operations such as packaging or pelleting.

When operating in accordance with the present invention, a stream comprising water vapor is introduced into purge conveyor 72 via conduit 79 and is removed via conduit 80. The water vapor contacts said polymer particles as they are moved through the conveyor. Auger 73 can be of the lifting flight type, if desired, so as to provide more efficient contacting. Although not shown in the drawing, said purge conveyor 72 can also be provided with a jacket through which hot water or other suitable heat exchange fluid can be circulated as described above in connection with drier-conveyor 61. Treated polymer product is withdrawn through conduit 78 and passed directly to an extruder for extrusion into essentially streak-free film, or to storage for later extrusion or other use. Any suitable type of conventional extruder can be employed for producing said film. The chill roll method of film production is presently preferred.

A more comprehensive understanding of the invention can be obtained by referring to the following illustrative examples which are not intended, however, to be unduly limitative of the invention.

*Example I*

Propylene is polymerized in a mass polymerization in the presence of hydrogen and utilizing a catalyst system consisting of diethylaluminum chloride and the above-described reaction product prepared by reacting titanium tetrachloride with aluminum. Said reaction product comprised 4.74 weight percent aluminum, 25.0 weight percent titanium, and 69.8 weight percent chlorine. The product obtained from the polymerization is thereafter treated with acetylacetone so as to obtain a polymer product having a very low ash content. The polymerization and the treatment of the polymer are conducted in equipment similiar to that shown in the drawing and the details of the process are described hereinafter in conjunction with the drawing.

A purified feed stream of liquid propylene is charged to loop reactor 10 through line 11. Said reaction product and the diethylaluminum chloride are introduced into the reactor through lines 12 and 13, respectively. Hydrogen enters the reactor along with the propylene after being introduced into the propylene feed line through line 14. The loop reactor is operated at a temperature of 130° F. and a pressure of 370 p.s.i.a. The polymerization temperature is maintained at 130° F. by circulating water through the heat exchange jackets with which the loop reactor is provided. The residence time of the reactant materials in the loop reactor is about 3 hours. An effluent stream containing solid polymer in particle form, liquid propylene, catalyst residues and soluble polymer is removed from the loop reactor through line 27. This effluent stream contains about 25 weight percent solid polymer.

The effluent stream recovered from the loop reactor is then passed into contact tank 29. Prior to entering the contact tank, a one weight precent solution of acetylacetone in propylene is added to the stream. In the contact tank, the solid polymer is brought into intimate contact with the acetylacetone. The contact tank is operated at a temperature of 140° F. and a pressure of 370 p.s.i.a. The temperature in the contact tank is maintained at 140° F. by introducing heated n-pentane into the tank through line 34. After a contact time of 30 minutes, the treated effluent stream is passed into wash tank 41. In the wash tank, the treated effluent stream is contacted in countercurrent flow with liquid propylene charged to the tank through line 42. About 12 pounds of liquid propylene per pound of polymer is employed as the wash liquid. A stream containing liquid propylene, catalyst residues and soluble polymer is taken overhead from the wash tank through line 43 and thereafter passed into cyclone 44. Solid polymer carried over in the overhead stream is separated out in the cyclone and returned to the wash tank through line 46. The overflow from the cyclone is recovered through line 47, and the rate of withdrawal of the overflow is controlled by reactor valve 50 which operates so as to maintain a pressure of 370 p.s.i.a. in the loop reactor. A slurry containing about 50 weight percent solid polymer in liquid propylene is withdrawn from the bottom of wash tank 41 through line 48. The rate of withdrawal of the solid polymer is controlled by means of a cyclically operated motor valve 49. After passing through motor valve 49, the slurry of solid polymer in liquid propylene passes into flask tank 54 which is operated at a temperature of −32° F. and 25 p.s.i.a. The propylene flashes off and is removed from the flash tank through line 56. After separation of any solids contained in the gaseous propylene by means of cyclone 57, the material is then treated prior to reuse in the process.

Solid polymer containing residual propylene drops from the bottom of flash tank 54 into drier-conveyor 61. In the conveyor, the polymer is heated by means of hot water which is circulated through the jacket with which the conveyor is equipped. As a result of this heating, propylene is evaporated and then removed through line 67. Polymer solids fall through conduit 69 attached to the end of conveyor 61 and then enter purge conveyor 72. In the purge conveyor, the polymer solids are contacted with dry nitrogen which functions as a purge gas to remove any remaining propylene. Solid polypropylene in particle form, which is recovered from the purge conveyor through line 78, is thereafter passed to suitable storage facilities. The polypropylene so recovered contains less than 0.01 weight percent ash. The various flow rates employed in the above-described process are shown hereinbelow in Table I where the stream numbers refer to the line numbers shown in the drawing. All flow rates are given in pounds per stream day.

gas was introduced at the other end so that it contacted said polymer particles countercurrently as they passed through said housing. The treated polymer was collected at the outlet of said housing.

TABLE I

| Stream No. | 11 | 14 | 12 | 13 | 27 | 30 | 34 | 37 |
|---|---|---|---|---|---|---|---|---|
| | Propylene to reactor | Hydrogen to reactor | RP[1] to reactor | DEAC[2] to reactor | Reactor effluent | Acetyl acetone | Pentane to contact tank | Contact tank effluent |
| Hydrogen | 40 | 40 | | | 40 | | | 40 |
| Propylene | 257,160 | | | | 160,900 | | | 160,900 |
| Propane | 17,875 | | | | 17,875 | | | 17,875 |
| Acetylacetone | | | | | | 786 | | 411 |
| n-Pentane | 1 | | 100 | 240 | 341 | | 44,000 | 44,341 |
| Soluble polymer | | | | | 4,800 | | | 4,800 |
| Polypropylene | | | | | 91,460 | | | 91,460 |
| DEAC[2] | | | | 80 | 80 | | | |
| Titanium trichloride | | | 100 | | 100 | | | |
| Catalyst residues | | | | | | | | 448 |
| Hydrogen chloride | | | | | | | | 93 |
| Ethane | | | | | | | | 24 |
| Inert gas | | | | | | | | |
| Total, lb./sd | 275,076 | 40 | 200 | 320 | 275,596 | 786 | 44,000 | 320,392 |

| Stream No. | 43 | 42 | 48 | 56 | 76 | 77 | 78 |
|---|---|---|---|---|---|---|---|
| | Wash tank overhead | Propylene to wash col. | Washed polymer to flash tank | Flash tank overhead | Inert gas to purge conveyor | Purge conveyor off-gas | Polymer to process |
| Hydrogen | 40 | | | | | | |
| Propylene | 228,900 | 150,000 | 82,000 | 81,800 | 200 | | |
| Propane | 25,875 | 16,000 | 8,000 | 7,980 | 20 | | |
| Acetylacetone | 411 | | | | | | |
| n-Pentane | 44,336 | | 5 | 5 | | | |
| Soluble polymer | 4,800 | | | | | | |
| Polypropylene | | | 91,460 | | | | 91,460 |
| DEAC[2] | | | | | | | |
| Titanium trichloride | | | | | | | |
| Catalyst residues | 448 | | Trace | | | | |
| Hydrogen chloride | 93 | | | | | | |
| Ethane | 24 | | | | | | |
| Inert gas | | | | | 800 | 800 | |
| Total, lb./sd | 304,927 | 166,000 | 181,465 | 89,785 | 1,020 | 800 | 91,460 |

[1] RP=above-described reaction product obtained by reacting aluminum and titanium tetrachloride.
[2] Diethylaluminum chloride.

*Example II*

A series of runs was carried out in which polypropylene was treated with water vapor in accordance with the present invention using various lots of propylene which had been prepared in a pilot plant in accordance with the method of Example I and employing apparatus embodying the essential features of the apparatus illustrated in the drawing.

In Runs 2, 3, 5, 7, and 9–17 inclusive the treatment of the polymer with water vapor was carried out in the following manner. The treating vapor, wet nitrogen gas, was passed through a preheating section comprising a double-pipe heat exchanger wherein said treating vapor was heated to the desired treating temperature. At the end of said preheating section powdered polymer was pressured into the flowing gas stream. Said flowing gas stream, having the polymer suspended therein, was then passed through a treating section which also comprised a double-pipe heat exchanger. The velocity of the flowing gas stream was sufficient to transport the powdered polymer with little or no settling. The treated polymer was collected in a bag filter at the end of said treating section.

In Runs 22–30 inclusive the wet nitrogen gas was passed through a Holoflite purge conveyor as the purge gas. Said Holoflite conveyor comprises a housing having a screw or auger therein for moving the powdered polymer therethrough. The powdered polymer particles were introduced into one end of said housing and the wet nitrogen In Runs 20 and 21 the polymer particles were treated in the Holoflite conveyor as in Runs 22–30 except that dry nitrogen gas was used.

Samples of the treated polymer from each of said runs were extruded into a chill roll film using a 1.5 inch Davis standard vented extruder having a 26 to 1 L/D screw ratio. The polymer resident time in the extruder was approximately 4 minutes and the output was about 12 pounds per hour. The thickness of the films was approximately 0.75 mil. Samples of untreated polymer from control Runs 1, 4, 6, 8, and 19 were also extruded in the same manner as for said treated polymer. All extrusions were carried out at 550° F.

The product films were rated visually employing a rating scale in which each film was assigned a number from 0 to 10. In said scale a rating of 0 indicates a completely bubble and streak-free film. A rating of 10 indicates a badly streaked film. A rating of 1 indicates a completely acceptable film which is comparable in every respect with commercial films in common use in the packaging industry. A rating of 2 indicates a less acceptable film, not as good as the majority of films in common use, but which can be employed for many uses. A rating of 3 indicates a borderline acceptable film but one which can still be used for some applications where optical properties are not of primary importance. A rating of 4 or above indicates an unacceptable film.

The treating conditions and the results of said film rating tests are set forth in Table II below.

TABLE II
*Treatment of Polypropylene With Wet Nitrogen*

| Run No. | Treating Conditions | | | Film rating |
|---|---|---|---|---|
| | Temp., °F. | Lbs. H₂O per lb. of N₂ | Time, min. | |
| 1 | | ¹ Control | | 8 |
| 2 | 240 | 0.25 | 3 | 1 |
| 3 | 240 | 0.25 | 3 | 1 |
| 4 | | ² Control | | 6 |
| 5 | 240 | 0.25 | 3 | 2 |
| 6 | | ³ Control | | 8 |
| 7 | 240 | 0.25 | 3 | 2 |
| 8 | | ⁴ Control | | 7 |
| 9 | 240 | 0.25 | 3 | 1 |
| 10 | 240 | 0.014 | 3 | 8 |
| 11 | 270 | 0.014 | 3 | 4 |
| 12 | 270 | 0.06 | 3 | 8 |
| 13 | 240 | 0.06 | 3 | 7 |
| 14 | 240 | 0.06 | 8 | 5 |
| 15 | 240 | 0.25 | 8 | 1 |
| 16 | 270 | 0.25 | 3 | 2 |
| 17 | 270 | 0.25 | 1 | 2 |
| 18 | 212 | 1.90 | 8 | 4 |
| 19 | | ⁵ Control | | 9 |
| 20 | 240 | Dry | 14 | 8 |
| 21 | 260 | Dry | 14 | 8 |
| 22 | 220 | 0.09 | 14 | 8 |
| 23 | 220 | 0.16 | 14 | 3 |
| 24 | 220 | 0.25 | 14 | 3 |
| 25 | 240 | 0.09 | 14 | 3 |
| 26 | 240 | 0.16 | 14 | 2 |
| 27 | 240 | 0.25 | 14 | 2 |
| 28 | 260 | 0.09 | 14 | 3 |
| 29 | 260 | 0.16 | 14 | 1 |
| 30 | 260 | 0.25 | 14 | 1 |

¹ Control for Runs 2 and 3.
² Control for Runs 5 and 10–17, inclusive.
³ Control for Run 7.
⁴ Control for Run 9.
⁵ Control for Runs 20–30, inclusive.

The data in the above Table II show that the streaking problem can be overcome and a completely acceptable film can be produced from polymers which have been treated with a diketone to remove catalyst residues by treating said polymers with wet nitrogen. Runs 20 and 21 show that dry nitrogen does not effect any improvement. Melt index measurements and other physical tests on the treated polymers (not reported here) show that the polymer products were not degraded by the water vapor treatment.

Example III

Another series of runs was carried out in the same manner and employing the same apparatus as employed in Runs 2, 3, 5, 7, and 9–17 of Example II. In this series of runs the treating agent was superheated steam. Due to apparatus limitations this treatment left the polymer moist with water and it was necessary to follow the steam treatment with a dry nitrogen treatment in order to dry the polymer. Runs made using dry nitrogen only show that said dry nitrogen does not effect an improvement in the film. This is verified by Runs 20 and 21 of Example II.

Samples of the treated polymer and untreated polymer from the control runs were extruded into approximately 0.75 mil films in the manner described in Table II. The product films were rated visually employing the scale described above. Treating conditions for said runs and the results of the film rating tests are set forth in Table III below.

TABLE III
*Treatment of polypropylene with superheated steam and dry nitrogen*

| Run No. | Treating Conditions | | | | Film rating |
|---|---|---|---|---|---|
| | Superheated steam temp., °F. | Time min. | Dry N₂ temp., °F. | Time min. | |
| 32 | | Control | | | 8 |
| 33 | 240 | 3 | 240 | 4 | 1 |
| 34 | | Control | | | 6 |
| 35 | 240 | 3 | 240 | 4 | 1 |
| 36 | 275 | 3 | 275 | 3 | 1 |

The data in the above Table III show that the streaking problem can be overcome and a completely acceptable film can be produced from polymers which have been treated with a diketone to remove catalyst residues by treating said polymers with steam.

While the invention has been described in the above examples in connection with films having a thickness of approximately 0.75 mil, the invention is not so limited. Polymers treated in accordance with the present invention can be extruded into substantially streak-free films of any desired thickness, e.g., from 0.5 to 20 mils.

The polypropylene product prepared in accordance with this invention has utility in applications where solid plastics are employed. The polymer can be molded to form articles of any desired shape such as bottles and other containers for liquids. Furthermore, the product can be formed into fibers and pipe by extrusion.

As will be evident to those skilled in the art, many variations and modifications of this invention can be practiced in view of the foregoing disclosure. Such variations and modifications are believed to clearly come within the spirit and scope of the invention.

We claim:

1. In a mass polymerization process wherein a liquid mono-1-olefin is contacted in a polymerization zone with a catalyst capable of polymerizing said olefin under polymerization conditions so as to form a solid polymer, said solid polymer is contacted with a diketone selected from the group consisting of compounds having the following formulas:

(1)
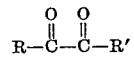

and (2)
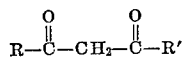

wherein R and R' are hydrocarbon radicals to remove catalyst residues therefrom, and a solid polymer product substantially free of catalyst residues is recovered, the improvement which comprises: contacting said polymer product with a sufficient amount of water vapor at a temperature within the range of from 220 to 275° F. for a period of time sufficient to yield a polymer product which when extruded into film will produce a substantially streak-free film.

2. The method of producing a substantially streak-free film from a solid polymer of a mono-1-olefin, which method comprises: contacting a mono-1-olefin with a catalyst capable of polymerizing said olefin under mass polymerization conditions to form said solid polymer; treating said thus formed solid polymer with a diketone selected from the group consisting of compounds having the following formulas:

(1)
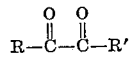

and (2)
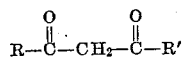

wherein R and R' are hydrocarbon radicals to remove catalyst residues therefrom; contacting said diketone treated polymer with a sufficient amount of water vapor at a temperature within the range of from 220 to 275° F. for a period of time within the range of from 0.5 to 20 minutes; and extruding said thus water vapor treated polymer into said film.

3. The method of claim 2 wherein said olefin is propylene.

4. The method of claim 2 wherein said diketone is acetylacetone.

5. The method of claim 2 wherein said diketone treated polymer is contacted with steam.

6. The method of claim 2 wherein said diketone treated polymer is contacted with an inert gas containing sufficient water vapor mixed therewith to provide an excess of water vapor during said water vapor contacting step.

7. In a mass polymerization process wherein a liquid mono-1-olefin is contacted in a polymerization zone with a catalyst capable of polymerizing said olefin under polymerization conditions so as to form solid polymer, an effluent containing solid polymer, catalyst residues, and liquid olefin is recovered from said polymerization zone, said effluent is contacted with a diketone selected from the group consisting of compounds having the following formulas:

(1)
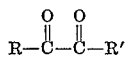

and (2)
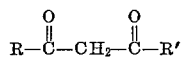

wherein R and R' are hydrocarbon radicals under conditions such that said olefin remains in liquid phase, the thus treated effluent is washed by contacting same with a low boiling hydrocarbon under conditions such that said low boiling hydrocarbon and said olefin remain in liquid phase; and a solid polymer product substantially free of catalyst residues is recovered from said washing step, the improvement which comprises: contacting said polymer product with a sufficient amount of water vapor at a temperature within the range of from 220 to 275° F. for a period of time within the range of from 0.5 to 20 minutes to yield a polymer product which when extruded into film will produce a substantially streak-free film.

8. In a mass polymerization process wherein a liquid mono-1-olefin is contacted in a polymerization zone with a catalyst comprising an organometal compound and a metal salt under polymerization conditions so as to form solid polymer in particle form, an effluent containing solid polymer, catalyst residues, and liquid olefin is recovered from said polymerization zone, said effluent is introduced into a contact zone and therein mixed with a diketone selected from the group consisting of compounds having the following formulas:

(1)
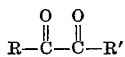

and (2)
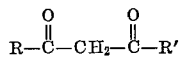

wherein R and R' are hydrocarbon radicals, said mixing occurring under conditions such that said olefin remains in liquid phase, the thus treated effluent is withdrawn from said contact zone and introduced into an upper portion of a wash zone, a wash liquid comprising a low boiling hydrocarbon is introduced into a lower portion of said wash zone and contacts said treated effluent in countercurrent flow under conditions such that said low boiling hydrocarbon and said olefin remain in liquid phase, a stream comprising mono-1-olefin, low boiling hydrocarbon, soluble polymer and catalyst residues is withdrawn from an upper portion of said wash zone, a stream comprising low boiling hydrocarbon and solid polymer substantially free of catalyst residues is recovered from a lower portion of said wash zone, and a solid polymer product is recovered from said last-mentioned stream, the improvement which comprises: contacting said polymer product with a sufficient amount of water vapor at a temperature within the range of from 220 to 275° F. for a period of time within the range of from 0.5 to 20 minutes to yield a polymer product which when extruded into film will produce a substantially streak-free film.

9. A process according to claim 8 in which said olefin is propylene, said wash liquid consists essentially of propylene, and said diketone is acetylacetone.

10. A process according to claim 9 wherein said solid polymer product is contacted with steam for a period of time within the range of from 1 to 8 minutes.

11. A process according to claim 9 wherein said solid polymer product is contacted with an inert gas containing from 0.1 to 0.4 pound of water vapor per pound of inert gas for a period of time within the range of from 1 to 8 minutes.

12. A process according to claim 11 wherein said inert gas is nitrogen.

References Cited by the Examiner
UNITED STATES PATENTS

| | | | |
|---|---|---|---|
| 2,955,107 | 10/60 | Lovett et al. | 260—94.9 |
| 2,957,861 | 10/60 | Goins | 260—94.9 |
| 3,098,845 | 7/63 | Cull et al. | 260—94.9 |

FOREIGN PATENTS

| | | |
|---|---|---|
| 832,996 | 4/60 | Great Britain. |
| 882,675 | 11/61 | Great Britain. |

JOSEPH L. SCHOFER, *Primary Examiner.*